United States Patent
Lu et al.

(10) Patent No.: US 11,132,101 B2
(45) Date of Patent: Sep. 28, 2021

(54) ICON MOVING METHOD, TERMINAL AND STORAGE MEDIUM

(71) Applicant: GUANGDONG OPPO MOBILE TELECOMMUNICATIONS CORP., LTD., Guangdong (CN)

(72) Inventors: Ya Lu, Guangdong (CN); Guojun Sun, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/643,649

(22) PCT Filed: Sep. 8, 2017

(86) PCT No.: PCT/CN2017/101003
§ 371 (c)(1),
(2) Date: Mar. 2, 2020

(87) PCT Pub. No.: WO2019/047147
PCT Pub. Date: Mar. 14, 2019

(65) Prior Publication Data
US 2020/0241732 A1  Jul. 30, 2020

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 1/1652* (2013.01); *G06F 3/04842* (2013.01); *G06F 3/04845* (2013.01); *H04M 1/72403* (2021.01)

(58) Field of Classification Search
CPC ............... G06F 3/04817; G06F 1/1652; G06F 3/04842; G06F 3/04845; H04M 1/72403
See application file for complete search history.

(56) References Cited

U.S. PATENT DOCUMENTS 8,271,047 B2 *  9/2012  Kim ...................... G06F 1/1615
                                                         455/566
9,830,075 B2 * 11/2017  Kim ..................... G06F 3/04845
(Continued)

FOREIGN PATENT DOCUMENTS

CN     103186311     7/2013
CN     103809848     5/2014
(Continued)

OTHER PUBLICATIONS

EPO, Extended European Search Report for EP Application No. 17924382.9, dated Aug. 25, 2020.
WIPO, ISR for PCT/CN2017/101003, May 31, 2018.

*Primary Examiner* — David Phantana-angkool
(74) *Attorney, Agent, or Firm* — Hodgson Russ LLP

(57) ABSTRACT

The embodiments of the present disclosure provide a method of moving an icon. The method includes: displaying a first page of a home screen in the main display area under an icon management mode; when receiving a first operation on the icon in the first page, displaying the icon in the subsidiary display area in response to a first operation; switching the first page to a second page of the home screen and displaying the second page; and displaying the icon in the second page in response to a second operation, when the second operation is received. The embodiments of the present disclosure solve the problems of high operation difficulty and low operation efficiency when moving icons in the related art.

20 Claims, 15 Drawing Sheets

(51) Int. Cl.
   *G06F 1/16* (2006.01)
   *G06F 3/0484* (2013.01)
   *H04M 1/72403* (2021.01)

(56) References Cited

U.S. PATENT DOCUMENTS

| | | | | |
|---|---|---|---|---|
| 10,222,900 B2* | 3/2019 | Jeong | | G06F 3/04883 |
| 10,379,720 B2* | 8/2019 | Ryu | | G09G 5/373 |
| 10,481,759 B2* | 11/2019 | Lee | | G06F 9/451 |
| 10,681,195 B2* | 6/2020 | Kwak | | G06F 1/1647 |
| 2004/0006765 A1* | 1/2004 | Goldman | | G06F 8/315 |
| | | | | 717/116 |
| 2010/0295789 A1 | 11/2010 | Shin et al. | | |
| 2011/0252346 A1* | 10/2011 | Chaudhri | | G06F 3/0482 |
| | | | | 715/765 |
| 2013/0300697 A1* | 11/2013 | Kim | | G06F 3/0488 |
| | | | | 345/173 |
| 2014/0078047 A1* | 3/2014 | Seo | | G06F 3/0412 |
| | | | | 345/156 |
| 2014/0165006 A1* | 6/2014 | Chaudhri | | G06F 3/0487 |
| | | | | 715/835 |
| 2014/0237420 A1* | 8/2014 | Song | | G06F 3/04845 |
| | | | | 715/790 |
| 2015/0015511 A1* | 1/2015 | Kwak | | G06F 3/0412 |
| | | | | 345/173 |
| 2015/0346899 A1* | 12/2015 | Jung | | G06F 3/1423 |
| | | | | 345/173 |
| 2016/0062556 A1* | 3/2016 | Chung | | G06F 3/017 |
| | | | | 715/781 |
| 2016/0062600 A1* | 3/2016 | Kim | | G06F 3/0482 |
| | | | | 715/765 |
| 2016/0132236 A1* | 5/2016 | Sun | | G06F 3/04886 |
| | | | | 715/773 |
| 2016/0188197 A1* | 6/2016 | Ryu | | G06F 3/002 |
| | | | | 345/156 |
| 2016/0266774 A1 | 9/2016 | Kim et al. | | |
| 2016/0313966 A1* | 10/2016 | Jeong | | G04G 21/00 |
| 2017/0147189 A1* | 5/2017 | Ryu | | G06F 3/04845 |
| 2017/0277380 A1* | 9/2017 | Shan | | G06F 3/0488 |
| 2018/0101291 A1* | 4/2018 | Park | | G06F 3/0486 |
| 2020/0192529 A1* | 6/2020 | Li | | G06F 3/04886 |
| 2020/0233568 A1* | 7/2020 | Wang | | G06F 3/04817 |
| 2020/0241732 A1* | 7/2020 | Lu | | H04M 1/72403 |
| 2020/0333944 A1* | 10/2020 | Guo | | G06F 3/0488 |
| 2021/0064322 A1* | 3/2021 | Lim | | G06F 1/1683 |
| 2021/0117068 A1* | 4/2021 | Chae | | G06F 3/04186 |

FOREIGN PATENT DOCUMENTS

| | | |
|---|---|---|
| CN | 103955329 | 7/2014 |
| CN | 104102427 | 10/2014 |
| CN | 105739887 | 7/2016 |
| CN | 105843481 | 8/2016 |
| CN | 106775425 | 5/2017 |

* cited by examiner

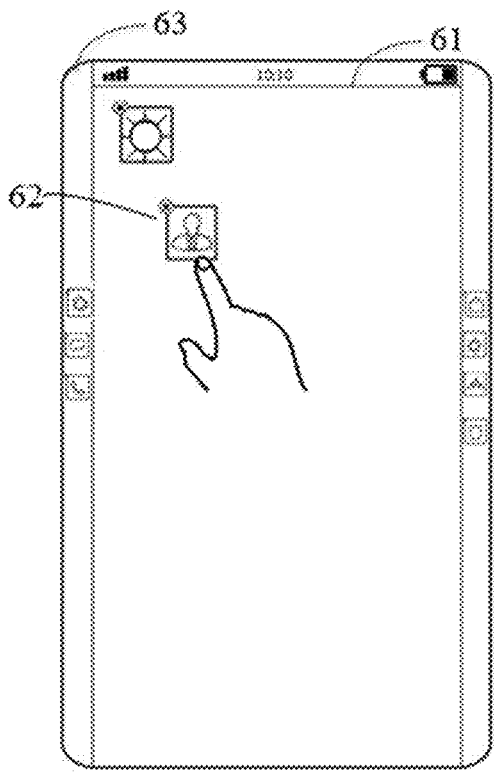

FIG. 9

```
┌─────────────────────────────────────────┐
│ in the icon management mode, a first page of the home │─501
│ screen is displayed in the main display area, an icon has a │
│       first size in the first page      │
└─────────────────────────────────────────┘
                    ▼
┌─────────────────────────────────────────┐
│ when the first operation on the icon in the first page is │─502
│ received, the icon is displayed with a second size in a │
│ subsidiary display area according to the first operation, │
│  and the second size is smaller than the first size │
└─────────────────────────────────────────┘
                    ▼
┌─────────────────────────────────────────┐
│ when a selection operation on the icon displayed in the │─505
│   subsidiary display area is received, display a prompt of │
│ the icon in the main display area and the prompt includes │
│ an application name corresponding to the icon and/or an │
│              enlarged icon              │
└─────────────────────────────────────────┘
                    ▼
┌─────────────────────────────────────────┐
│ the first page is switched to a second page of the home │─503
│      screen and the second page is displayed     │
└─────────────────────────────────────────┘
                    ▼
┌─────────────────────────────────────────┐
│ when the second operation is received, the icon is │─504
│ displayed with a first size in the second page, and the first │
│       size is larger than the second size       │
└─────────────────────────────────────────┘
```

FIG. 10

ICON MOVING METHOD, TERMINAL AND STORAGE MEDIUM

CROSS-REFERENCE TO RELATED APPLICATION

This application is a U.S. national phase application of International Application No. PCT/CN2017/101003, filed Sep. 8, 2017, the entire disclosure of which is incorporated herein by reference.

TECHNICAL FIELD

The present disclosure relates to human-computer interaction technical field, and particularly to an icon moving method and device.

BACKGROUND

With the development of mobile terminals, the mobile terminal can install more and more applications. However, due to the limitation of the screen display area, the icons of the applications to be displayed on multiple screen pages, and many icons are displayed on each screen page.

In use, the user needs to press the icon to set it to a movable state, and then drag the icon to the target screen page when an icon in the current screen page needs to be moved to a target screen page. During the dragging, the user needs to press the icon and drag the icon to the edge of the screen, so that the mobile terminal switches to display the next screen page.

Obviously, when the target screen page is far away from the current screen page, the user needs to keep the action of pressing the icon for a longtime by using the above method. The user needs to operate again when the action of pressing the icon is interrupted, and only a single icon can be moved at a time cause low efficiency.

SUMMARY

The present disclosure provides an icon moving method and device, which can solve the problem of high operation difficulty and low operation efficiency when moving the icon. The method is as follows.

According to a first aspect of the embodiments of the present disclosure provides an icon moving method, applied to a terminal has a main display area and a subsidiary display area, the method includes:
displaying a first page of a home screen in the main display area, under an icon management mode;
when receiving a first operation on the icon displayed in the first page, displaying an icon in the subsidiary display area in response to the first operation;
switching the first page to a second page of the home screen and displaying the second page; and
displaying the icon in the second page in response to a second operation, when receiving the second operation.

In an optional embodiment, the icon has a first size in the first page and the operation of displaying the icon in the subsidiary display area, includes:
displaying the icon with a second size in the subsidiary display area, and the second size being smaller than the first size.

In an optional embodiment, after the operation of displaying the icon in the subsidiary display area, the method further including:
displaying a prompt of the icon in the main display area when receiving a selection operation on the icon displayed in the subsidiary display area, and the prompt comprises an application name corresponding to the icon and/or an enlarged icon.

In an optional embodiment, the icon has the second size in the subsidiary display area and the operation of displaying the icon in the second page, includes:
displaying the icon with the first size in the second page, and the first size being larger than the second size.

In an optional embodiment, wherein the operation of switching the first page to a second page of the home screen and displaying the second page of the home screen, includes:
determining an associated icon corresponding to the icon when receiving the selection operation on icon in the subsidiary display area, the type of the application indicated by the associated icon being the same as that indicated by the icon;
switching the first page to the second page where the associated icon is located.

In an optional embodiment, after the operation of switching the first page to the second page of the home screen and displaying the second page of the home screen, the method further including:
generating an application folder and adding the icon in the subsidiary display area to the application folder, when receiving a third operation in the subsidiary display area;
displaying the application folder in the second page.

In an optional embodiment, the method further including:
when leaving the icon management mode and there are unmoved icons remained in the subsidiary area, moving the unmoved icons to their respective initial pages or to the current page.

In an optional embodiment, wherein the terminal is provided with a curved surface screen, the main display area is a front display area of the curved surface screen, and the subsidiary display area is a side display area of the curved surface screen.

According to a second aspect of the embodiments of the present disclosure provides an icon moving device, applied to a terminal has a main display area and a subsidiary display area, the device includes:
a first displaying module, configured to display a first page of a home screen in the main display area under an icon management mode;
a second displaying module, configured to when receiving a first operation on the icon displayed in the first page, display the icon in the subsidiary display area in response to a first operation;
a switching module, configured to switch the first page to a second page of the home screen and display the second page of the home screen; and
a third displaying module, configured to display the icon in the second page in response to a second operation, when receiving the second operation.

In an optional embodiment, wherein the icon has a first size in the first page and the second displaying module is configured to perform the operations of:
displaying the icon with a second size in the subsidiary display area, and the second size being smaller than the first size.

In an optional embodiment, wherein the device further including:
a fourth displaying module, configured to display a prompt of the icon in the main display area, when receiving a selection operation on the icon displayed in the subsidiary display area, and the prompt comprises an application name corresponding to the icon and/or an enlarged icon.

In an optional embodiment, wherein the icon has the second size in the subsidiary display area and the third displaying module is configured to perform the operations of:

displaying the icon with the first size in the second page, and the first size being larger than the second size.

In an optional embodiment, wherein the switching module is configured to perform the operations of:

determining an associated icon corresponding to the icon when receiving the selection operation on the icon in the subsidiary display area, the type of the application indicated by the associated icon being the same as that indicated by the icon;

switching the first page to the second page, and the second page comprises the associated icon.

In an optional embodiment, wherein the device further including:

a generating module, configured to generate an application folder and add the icon in the subsidiary display area to the application folder, when receiving a third operation in the subsidiary display area;

a fifth displaying module, configured to display the application folder in the second page.

In an optional embodiment, wherein the device further including:

a moving module, configured to when leaving the icon management mode and there are unmoved icons remained in the subsidiary area, move the unmoved icons to their respective initial pages or to the current page.

In an optional embodiment, wherein the terminal is provided with a curved surface screen, the main display area is a front display area of the curved surface screen, and the subsidiary display area is a side display area of the curved surface screen.

According to a third aspect of the embodiments of the present disclosure provides a terminal, wherein the terminal with a main display area and a subsidiary display area, and the terminal comprises a processor, a memory connected to the processor, and a computer program stored in the memory and executable by the processor, the method for moving an icon is implemented when executing the computer program.

According to a fourth aspect of the embodiments of the present disclosure provides a computer-readable storage medium, having a computer program stored therein, the method for moving an icon is implemented when the computer program is executed by a processor.

The beneficial effects of the method provided in the embodiments of the present disclosure are as follows.

By dividing the display screen of the terminal into a main display area and a subsidiary display area, when moving the icon, the icon waited to be moved can be displayed in the subsidiary display area, thereby ensuring that the switching of the pages would not affect the subsidiary display area. According to the receiving of the moving operation, the icon displayed in the subsidiary display area is displayed in the current display page of the main display area, so the icons are moved across the screen. Compared to the method for moving icon in the related art, in the embodiments of the present disclosure, after moving the icon to the subsidiary display area, the user does not need to keep pressing the icon, so that can reduce the difficulty of operation of moving the icon. At the same time, the subsidiary display area can accommodate multiple icons, so that the user can move the multiple icons at the same time to improve the efficiency of the operation of moving the icons.

BRIEF DESCRIPTION OF THE DRAWINGS

In order to explain the technical solutions in the embodiments of the present disclosure more clearly, the drawings used in the description of the embodiments are briefly introduced below. Obviously, the drawings in the following description are just some embodiments of the present disclosure. For those of ordinary skill in the art, other drawings can be obtained based on these drawings without paying creative labor.

FIG. 9 is a schematic diagram of a process of moving an icon to a main display area.

FIG. 10 is a schematic flowchart of an icon moving method according to another embodiment of the present disclosure.

DETAILED DESCRIPTION

In order to make the purpose, technical solution and advantages of this disclosure clearer, the embodiments of the present disclosure will be further described in detail below with reference to the accompanying drawings.

The "module" mentioned herein generally refers to a program or instructions stored in memory capable of implementing certain functions; the "unit" mentioned herein generally refers to a functional structure divided logically, and the "unit" Can be implemented by pure hardware, or a combination of software and hardware.

As used herein, "plurality" refers to two or more. "And/or" describes the association relationship between related objects and indicates that there can be three types of relationships. For example, A and/or B can indicate that there are three cases in which A exists alone, A and B exist, and B exists alone. The character "/" generally indicates that the related objects are an "or" relationship.

Figure 1:
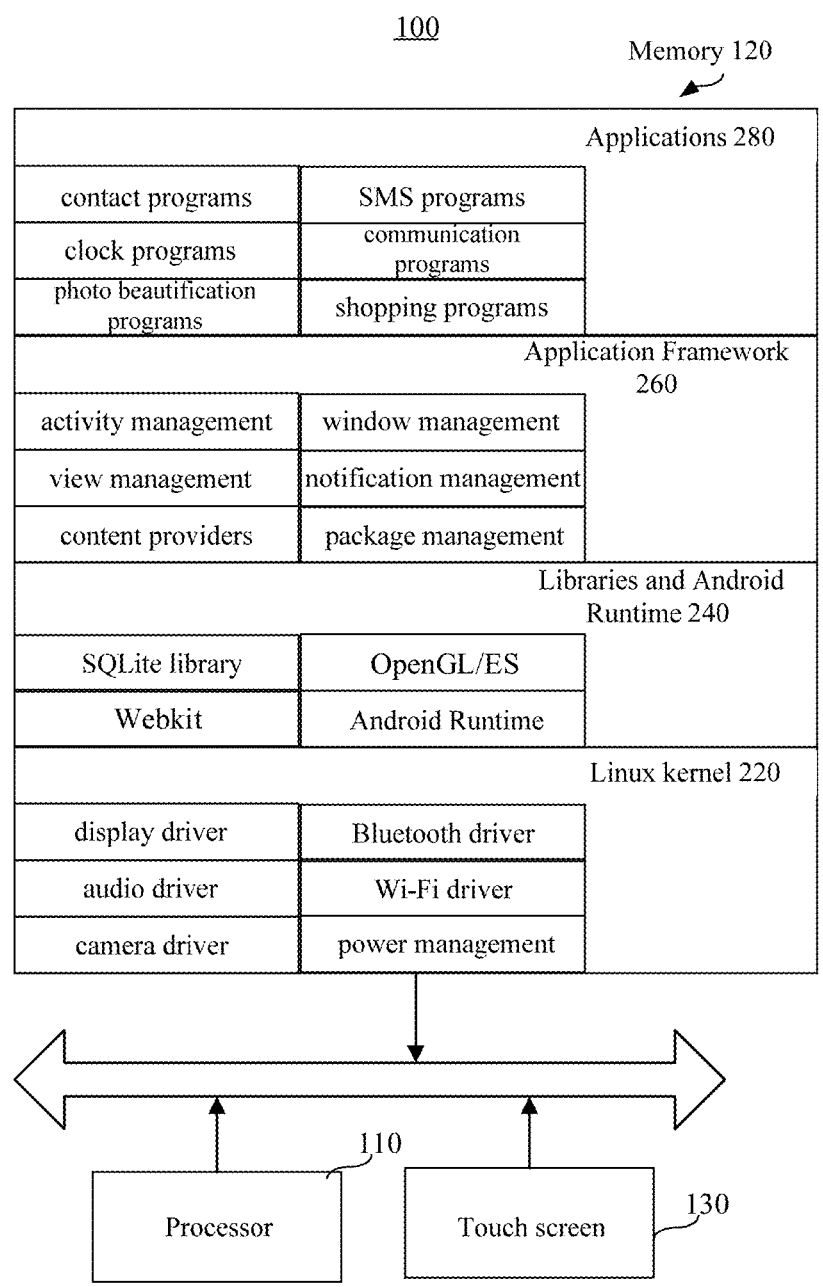
FIG. 1 and FIG. 2 are structural block diagrams of a terminal according to an embodiment of the present disclosure.
Figure 2:
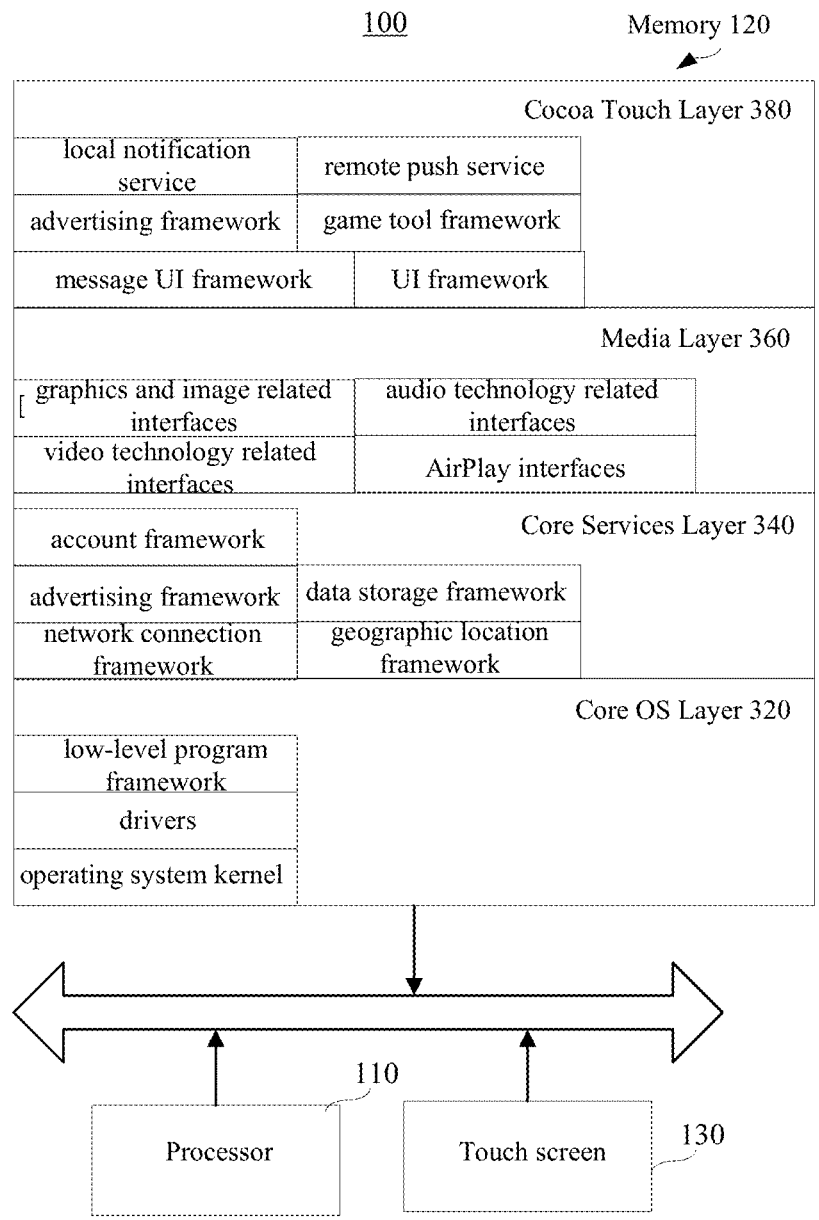

Please refer to FIG. 1 and FIG. 2, which are structural block diagrams of a terminal 100 according to an embodiment of the present disclosure. The terminal 100 may be a mobile phone, a tablet computer, a notebook computer, an e-book or the like. The terminal 100 of the present disclosure may include one or more of the following components: a processor 110, a memory 120, and a touch screen 130

The processor 110 may include one or more processing cores. The processor 110 uses various interfaces and lines to connect various parts of the entire terminal 100, and executes the various functions and data processing of the terminal 100 by running or executing instructions, programs, code sets or instruction sets stored in the memory 120 and by calling data stored in the memory 120. Optionally, the processor 110 may use at least one hardware form of Digital Signal Processing (DSP), Field-Programmable Gate Array (FPGA), and Programmable Logic Array (PLA) to implement the executions. The processor 110 may integrate one or more of a Central Processing Unit (CPU), a Graphics Processing Unit (GPU), and a modem. The CPU mainly handles the operating system, user interfaces, and application programs; the GPU is responsible for rendering and drawing of the content required to be displayed by the touch screen 130; and the modem is used for processing wireless communication. It can be understood that the modem may not be integrated into the processor 110, and may be implemented by a single chip.

The memory 120 may include Random Access Memory (RAM), and may also just include Read-Only Memory. Optionally, the memory 120 includes a non-transitory computer-readable storage medium. The memory 120 may be used to store instructions, programs, codes, code sets, or instruction sets. The memory 120 may include a storage program area and a storage data area, where the storage program area may store instructions for implementing an operating system, instructions for at least one function such as a touch function, a sound playback function, an image playback function, etc., the instructions for implementing the following method embodiments; the storage data area may store data such as audio data, phone book and the like created according to the use of the terminal 100.

Taking the operating system is an Android system as an example, the programs and data stored in the memory 120 are shown in FIG. 1. The memory 120 stores the Linux kernel 220, the Libraries and Android Runtime 240, the Application Framework 260 and Applications 280. The Linux kernel 220 provides low-level drivers for various hardware of the terminal 100, such as a display driver, an audio driver, a camera driver, a Bluetooth driver, a Wi-Fi driver, and power management. The Libraries and Android Runtime 240 provides main feature support for the android system through some C/C++ libraries. For example, the SQLite library provides the support of database, the OpenGL/ES library provides the support of 3D drawing, and the Webkit library provides the support of browser kernel. The Libraries and Android Runtime 240 also provides the Android Runtime 242, which mainly provides some core libraries, which can allow developers to write Android applications using the Java language. The Application Framework 260 provides various APIs that may be used when building applications. Developers can also use these APIs to build their own applications, such as activity management, window management, view management, notification management, content providers, Package management, call management, resource management, location management. At least one application program is running in the Applications 280, and these application programs may be native to the operating system such as contact programs, SMS programs, clock programs, camera applications, or the applications developed by third-party developers, such as communication programs, photo beautification programs, etc.

Taking the operating system is an IOS system as an example, the programs and data stored in the memory 120 are show in FIG. 2. The IOS system includes a Core OS Layer 320, a Core Services Layer 340, a Media Layer 360 and a Cocoa Touch Layer 380. The Core OS Layer 320 includes an operating system kernel, drivers, and a low-level program framework. These low-level program frameworks provide functions closer to hardware for use by the program framework located in the Core Services Layer 340. The Core Services Layer 340 provides system services and/or program frameworks required by an application program, such as a foundation framework, an account framework, an advertising framework, a data storage framework, a network connection framework, a geographic location framework, a motion framework, and the like. The Media Layer 360 provides audio-visual-related interfaces for applications, such as graphics and image related interfaces, audio technology related interfaces, video technology related interfaces, and audio and video transmission technologies such as AirPlay interfaces. The Cocoa Touch Layer 380 provides various commonly-used interface-related frameworks for application development. The Cocoa Touch Layer 380 is responsible for user touch interaction operations on the terminal 100. For example, local notification service, remote push service, advertising framework, game tool framework, message user interface (UI) framework, user interface UIKit framework, map framework, etc.

The FIG. 2 illustrates the frameworks, the frameworks related to most applications include but are not limited to, a basic framework of the Core Services Layer 340 and a UIKit framework of the Cocoa Touch Layer 380. The basic framework provides many basic object classes and data types, and provides the most basic system services for all applications, regardless of the UI. The classes provided by the UIKit framework are basic UI class libraries for creating touch-based user interfaces. IOS applications can provide UI based on the UIKit framework, so it provides basic framework of the application for building user interfaces, drawing, handling the events of the user interaction, responding to gestures etc.

The touch screen 130 is configured to receive touch operations on or near it by the user using a finger, a touch pen, or any suitable object, and to display respective user interfaces of applications. The touch screen 130 is generally disposed on a front panel of the terminal 100. The touch screen 130 may be designed as a full screen, a curved surface screen or a special-shaped screen. The touch screen 130 can also be designed as a combination of the full screen and the curved surface screen, and a combination of the special-shaped screen and the curved surface screen, which is not limited in this embodiment.

Full Screen

The full screen may refer to a screen design in which the touch screen 130 occupies the front panel of the terminal 100 with a screen ratio exceeding a threshold such as 80% or 90% or 95%. A calculation method of the screen ratio is: (the area of the touch screen 130/the area of the front panel of the terminal 100)*100%; another calculation method of the screen ratio is: (the area of the actual display area in the touch screen 130/the area of front panel of terminal 100)

*100%; another calculation method of the screen ratio is: (diagonal line of the touch screen 130/diagonal line on the front panel of terminal 100)*100%. For example, as shown in FIG. 3, almost all areas on the front panel of the terminal 100 are touch screen 130, on the front panel 40 of the terminal 100, except the edge generated by the middle frame 41, all other areas are touch screen 130. The four corners of the touch screen 130 may be right-angled or rounded.

The full screen may also be a screen design in which at least one front panel component is integrated inside or below the touch screen 130. Optionally, the at least one front panel component includes a camera, a fingerprint sensor, a proximity light sensor, a distance sensor, and the like. In some embodiments, other components on the front panel of the terminal are integrated in all or part of the touch screen 130. For example, after dividing the photosensitive element in the camera into multiple photosensitive pixels, integrate the photosensitive pixels in a black area in each display pixel in the touch screen 130. Due to the at least one component on the front panel is integrated inside the touch screen 130, the full screen has a higher screen ratio.

In other embodiments, the front panel components on the front panel of the conventional terminal can also be set on the side or back of the terminal 100. For example, set an ultrasonic fingerprint sensor under the touch screen 130, and set a bone-conduction receiver inside the touch screen 130, and the camera is disposed on the side of the terminal and with a pluggable structure.

In some optional embodiments, when the terminal 100 adopts a full screen, a single side of the middle frame of the terminal 100, or two sides such as left side and right side, or four sides such as upper side, lower side, left side and right side are set edge touch sensors. The edge touch sensor is configured to detect at least one of the operations on the middle frame of the user such as the touch operation, click operation, press operation and slide operation. The edge touch sensor may be any one of the touch sensors, the thermal sensors and the pressure sensors. The user can operate on the edge touch sensor to control the applications in the terminal 100.

Curved Surface Screen

The curved surface screen refers to a screen design in which the cross section of the touch screen 130 has a curved shape and the projection is a plane along a direction parallel to the cross section, and the curved shape may be U-shaped. Optionally, the curved surface screen refers to a screen design manner that at least one side is curved shape. Optionally, the curved surface screen refers to that at least one side of the touch screen 130 extends to cover the middle frame of the terminal 100. Since the side of the touch screen 130 extends to the middle frame of the terminal 100 to cover the middle frame without the display function and the touch function as a displayable area and/or operable area, so that the curved surface screen has a higher screen ratio. Optionally, as show in FIG. 3B, the curved surface screen refers to a screen design that the two sides of the left side and the right side 42 are curved, or the two sides of the upper side and the lower side are curved, or the four sides of the upper side, lower side, left side and right side are curved. In an alternative embodiment, the curved surface screen is made of a touch screen material with flexibility.

Special-Shaped Screen

The special-shaped screen is a touch display screen with an irregular shape, the irregular shape is not a rectangle or a rounded rectangle. Optionally, the special-shaped screen refers to a screen design that has protrusions, notches, and/or holes on the rectangular or rounded rectangular touch screen 130. Optionally, the protrusions, notches, and/or holes can be located at the edge of the touch screen 130, the center of the touch screen 130, or both the edge and the center of the touch screen 130. When the protrusions, notches and/or holes is set on one edge, it can be set at the middle position or both ends of the edge; when the protrusions, notches and/or holes is set on the center of the screen, it can be set on the one or more of the region, the upper left region, the left region, the lower left region, the lower region, the lower right region, the right region, and the upper right region. When arranged in multiple areas, the protrusions, notches and holes can be distributed in a centralized or distributed manner; they can be distributed symmetrically or asymmetrically. Optionally, the number of the protrusions, notches and/or holes is not limited.

The special-shaped screen covers the upper and/or lower forehead area of the touch screen as a displayable area and/or an operable area, so that the touch screen takes up more space on the front panel of the terminal, so the special-shaped screen also has larger screen ratio. In some embodiments, the notches and/or holes are used to accommodate at least one front panel component. The front panel component includes at least one of the cameras, fingerprint sensors, proximity light sensors, distance sensors, handsets, ambient light sensors and physical buttons.

Figure 3A:
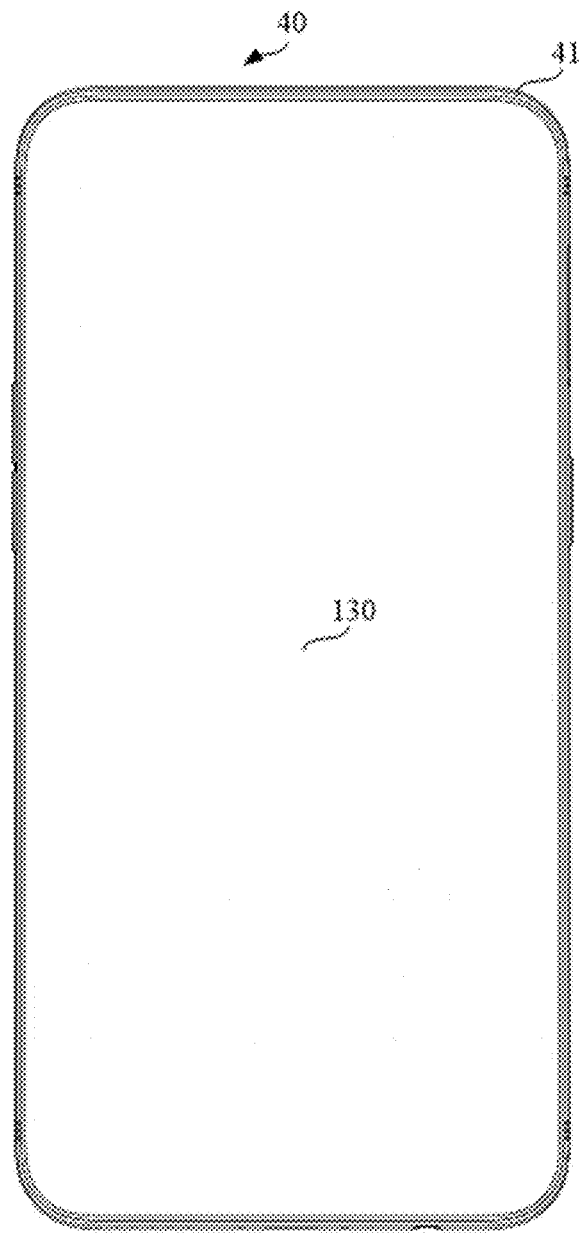
FIG. 3A to FIG. 3F are schematic diagrams of five terminals with different display screens according to the embodiment shown in FIG. 1 and FIG. 2.

For example, the notch may be defined at one or more edges of the special-shaped screen, and the notch may be a semi-circular notch, a right-angled rectangular notch, a rounded rectangular notch, or an irregularly-shaped notch. As shown in FIG. 3C, the special-shaped screen may be a screen is designed with a semi-circular notch 43 at the center of the upper edge of the touch screen 130. The area of the semi-circular notch is used to accommodate at least one of the front panel components such as the camera, the distance sensor (also known as the proximity sensor), the handset, and the ambient light brightness sensor. As shown in FIG. 3D, the special-shaped screen may be a screen is designed with a semi-circular notch 44 at the center of the lower edge of the touch screen 130. The area of the semi-circular notch is used to accommodate at least one of the physical buttons, fingerprint sensors and microphones. As shown in FIG. 3E, the special-shaped screen may be a screen is designed with a semi-elliptical notch 45 at the center of the lower edge of the touch screen 130, and the semi-elliptical notch is formed on the front panel of the terminal 100, and two semi-elliptical notches enclose an elliptical area. The elliptical area is used to accommodate the physical button or the fingerprint recognition modules. As shown in FIG. 3F, the special-shaped screen may be a screen is designed with at least one small hole 46 in the upper half of the touch screen 130. The area of the small hole is used to accommodate at least one of the front panel components such as the camera, the distance sensor, the handset, and the ambient light brightness sensor.

In addition, the person skilled in the art can understand that the structure of the terminal 100 shown in the above drawings does not constitute a limitation on the terminal 100. The terminal may include more or fewer components than shown in the figure, or combine some components, or different component arrangements. For example, the terminal 100 further includes components such as a radio frequency circuit, an input unit, a sensor, an audio circuit, a wireless fidelity (WiFi) module, a power supply, and a bluetooth module, which are not described herein again.

The disclosure provides an icon moving method, which is applied to a terminal having a main display area and a subsidiary display area, and the terminal may be a smart phone, a tablet computer, or an e-book reader.

Terminals with different types of screens, have different manners of dividing the main display area and the subsidiary display area. In a possible embodiment, when the terminal is configured with a full screen as shown in FIG. 3A, the subsidiary display area is an area of a predetermined width on both sides of the full screen, the main display area is an area except the subsidiary display area of the full screen.

Figure 3B:
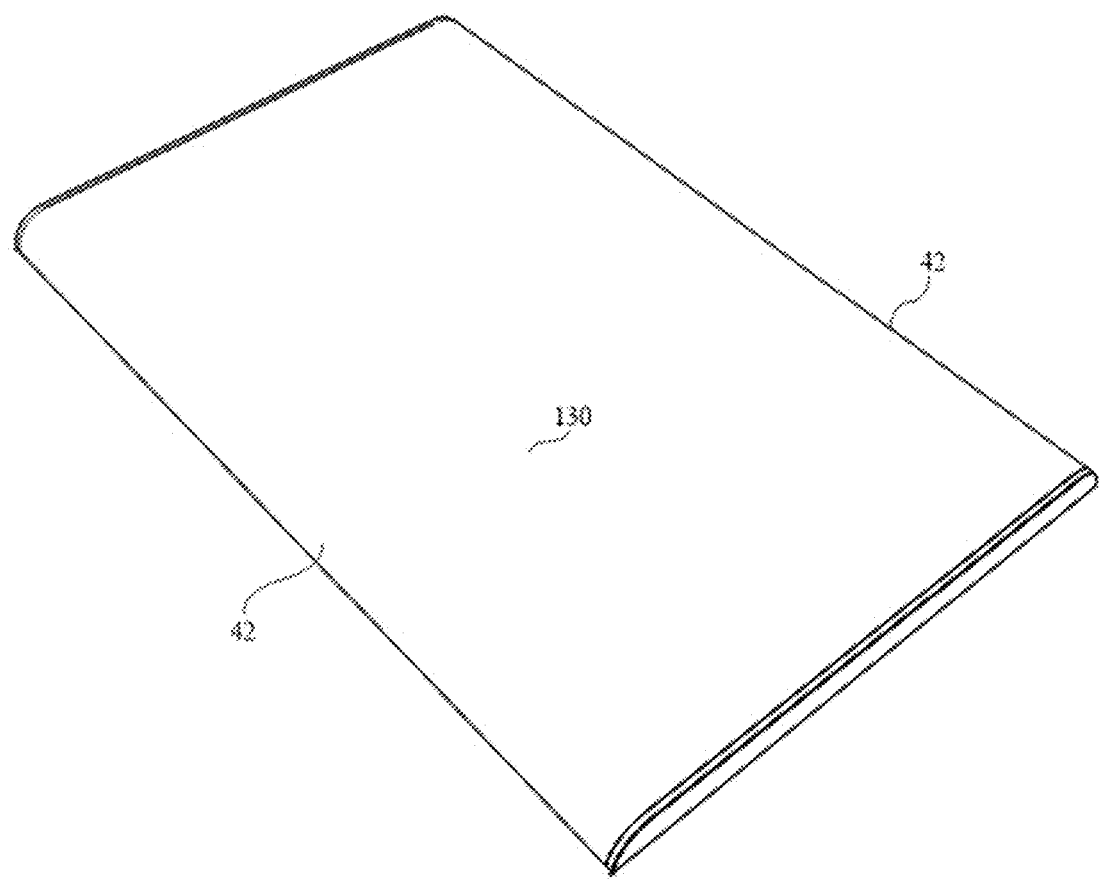
Figure 3C:
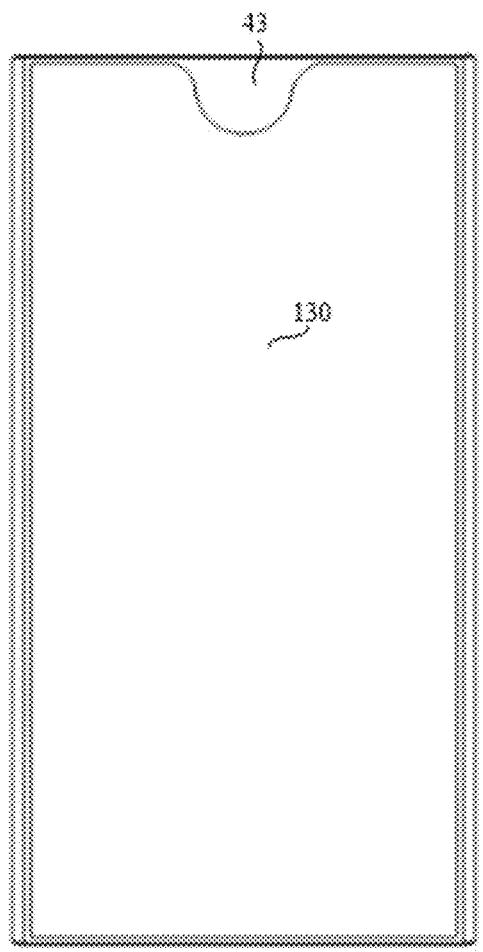
Figure 3D:
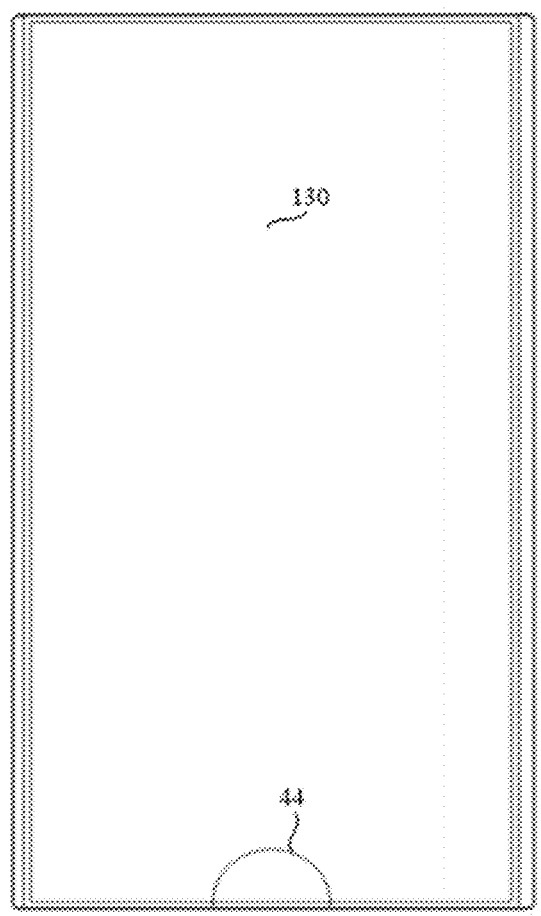
Figure 3E:
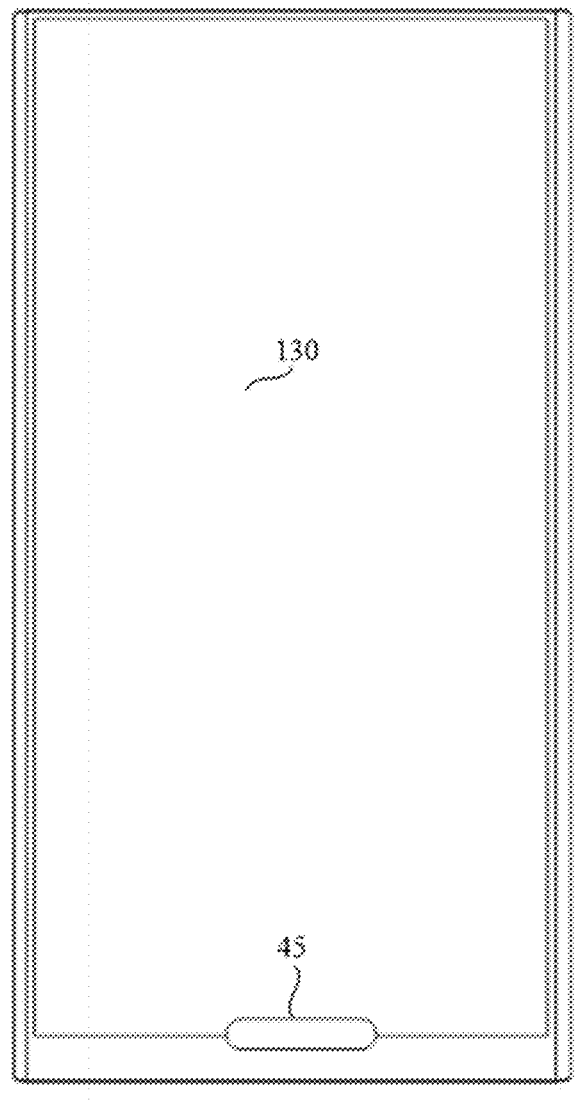
Figure 3F:
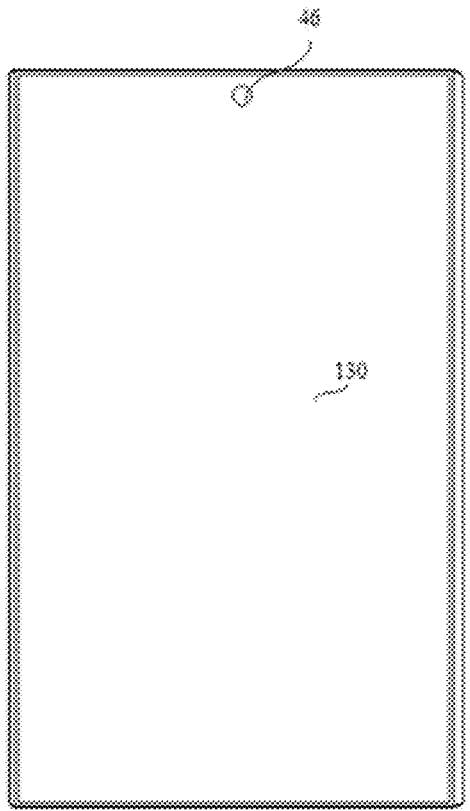

In other possible embodiments, when the terminal is configured with a curved surface screen as shown in FIG. 3B, the subsidiary display area is a side display area corresponding to the left side and the right side 42, and the main display area is a front display area expect the subsidiary display area of the curved surface screen.

In other possible embodiments, when the terminal is configured with a special-shaped screen as shown in FIG. 3C, the subsidiary display area is a screen display area on both sides of the notch, and the main display area is a screen display area expect the subsidiary display area of the special-shaped screen.

For the convenience of description, the description of the method for moving an icon of each embodiment of the present disclosure is applied the terminal with a curved surface screen as shown in FIG. 3B as an example, and does not limit the present disclosure.

Figure 4:
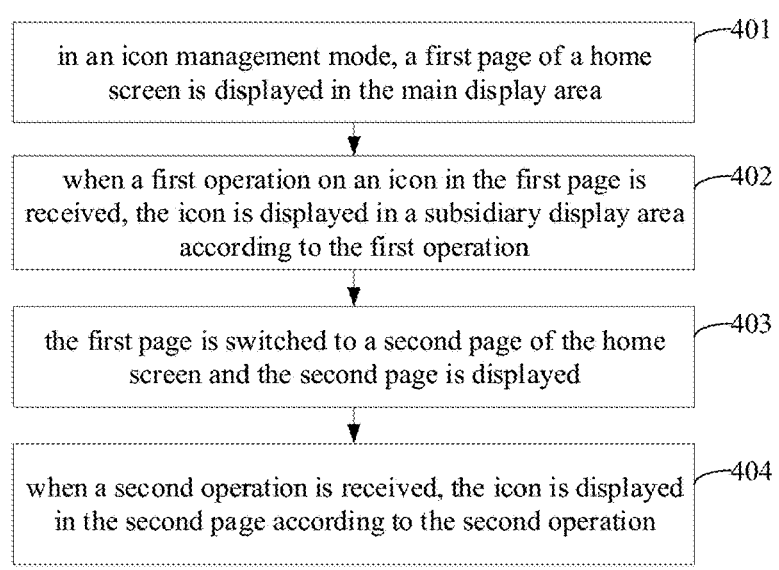
FIG. 4 is a schematic flowchart of an icon moving method according to an embodiment of the present disclosure.

Please refer to FIG. 4, which is a schematic flowchart of an icon moving method according to an embodiment of the present disclosure. In this embodiment, the method of moving an icon is applied to the terminal as shown in FIG. 3B as an example. The method includes the follows.

In an operation 401, in an icon management mode, a first page of a home screen is displayed in the main display area.

For the way of entering the icon management mode, in one possible embodiment, the terminal enters the icon management mode when receiving a long-press operation on any icon in pages of the home screen; in another possible embodiment, the terminal enters the icon management mode when a click operation on a predetermined function button such as a button for triggering the icon management mode is received. Each icon displayed in the pages of the home screen is in a movable state under the icon management mode.

Optionally, before entering the icon management mode, all the display areas of the display screen of the terminal, including the main display area and a subsidiary display area, are used to display the pages of the home screen. In the icon management mode, the terminal reduces the original pages of the home screen proportionately according to the size of the main display area, and displays the reduced pages of the home screen in the main display area. For example, when the display screen of the terminal is a curved surface screen, the pages of the home screen is displayed in the flat display area of the curved surface screen under the icon management mode.

In an operation 402, when a first operation on the icon in the first page is received, the icon is displayed in the subsidiary display area according to the first operation.

Optionally, the first operation refers to an operation of dragging the icon from the main display area to the subsidiary display area. In one possible embodiment, the terminal prestores the coordinates of the main display area and the subsidiary display area. Then terminal can detect the coordinates of the icon is changed (that is, the icon is moved), and the coordinates of the icon intersect with the coordinates of the subsidiary display area, the terminal determines that the first operation on the icon has been received. Then the terminal can display the icon in the subsidiary display area, and the icon will not display in the first page any more. When the user selects an icon in the main display area and drags the icon to the subsidiary display area.

In other possible embodiments, the first operation may also refer to a sweep operation on the icon in the main display area. When the user selects an icon in the main display area and performs the sweep operation on the icon to the subsidiary display area, the terminal displays the icon in the subsidiary display area.

Optionally, when the subsidiary display area displays at least two icons, the terminal adjusts the display order of the icons in the subsidiary display area according to the receiving of the adjustment signal. The adjustment signal is triggered when the users moves the icons in the subsidiary display area.

After this operation, the icon waited to be moved is fixedly displayed in the subsidiary display area, and the user does not need to keep a long press operation, so that reducing the difficulty of the operation for moving the icon.

In an operation 403, the first page is switched to a second page of the home screen and the second page is displayed.

After moving the icon waited to be moved to the subsidiary display area, the terminal further switches the page of the home screen displayed in the main display area until a target page of the home screen (i.e., the second page of the home screen). During the process of switching the page in the main display area, the content displayed in the subsidiary display area is not affected.

For the way of switching the pages of the home screen, in one possible embodiment, the terminal switches the first page to the second page and displays the second page when a sliding operation on the main display area is received.

In an operation 404, when a second operation is received, the icon is displayed in the second page according to the second operation.

Optionally, the second operation refers to an operation of dragging the icon from the subsidiary display area to the main display area. In one possible embodiment, the terminal stores the coordinates of the main display area and the subsidiary display area in advance. In the second page, when the user selects an icon in the subsidiary display area and drags the icon to the main display area, the terminal can detect the coordinates of the icon is changed (that is, the icon is moved), and the coordinates of the icon intersect with the coordinates of the main display area, the terminal determines that the second operation on the icon has been received. Then the terminal can display the icon in the second page that currently displayed of the main display area.

Similar to the above operation 402, the second operation may also refer to a sweep operation on the icon in the subsidiary display area. When the user selects an icon in the subsidiary display area and performs the sweep operation on the icon to the main display area, the terminal displays the icon in the main display area.

Expect for the operation on the icon, in other possible embodiments, the second operation may also refer to a click operation on a designated button or a free area in the subsidiary display area, which is not limited in the embodiment of the present disclosure.

Optionally, when the subsidiary display area displays multiple icons, the user may switch a home page of the home screen displayed in the main display area, and then move the icon to different home page of the home screen.

After the operations 401 to 404, the icon located in the first page is moved to the second page. During the process of moving, the user does not need to keep a long press operation, so that reducing the difficulty of the operation for moving the icon. And the subsidiary display area can accommodate multiple icons, it is convenient for user to move multiple icons to the pages of the home screen, and improves the efficiency of the operation.

In summary, in this embodiment, by dividing the display screen of the terminal into a main display area and a subsidiary display area, when moving the icon, the icon waited to be moved can be displayed in the subsidiary display area, thereby ensuring that the switching of the pages would not affect the subsidiary display area. According to the receiving of the moving operation, the icon displayed in the subsidiary display area is displayed in the current display page of the main display area, so the icons are moved across the screen. Compared to the method for moving icon in the related art, in the embodiments of the present disclosure, after moving the icon to the subsidiary display area, the user does not need to keep pressing the icon, so that can reduce the difficulty of operation of moving the icon. At the same time, the subsidiary display area can accommodate multiple icons, so that the user can move the multiple icons at the same time to improve the efficiency of the operation of moving the icons.

The width of the subsidiary display area is usually small, in actual implementation, in order to avoid the icon displayed in the subsidiary display area has the affection to the main display area, the terminal displays the icon in the subsidiary display area need to be reduced. Correspondingly, when display the moved icon in the pages of the screen, the icon needs to be restored. The following use a schematic embodiment for description.

Figure 5:
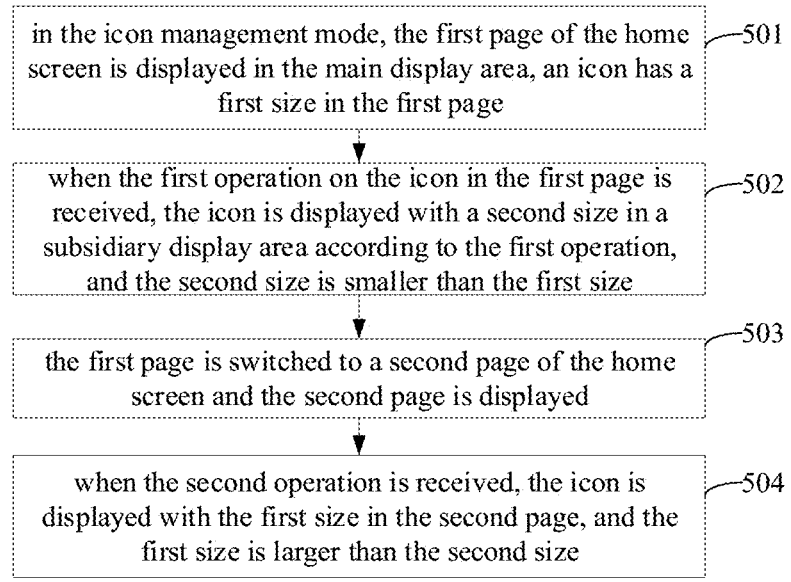
FIG. 5 is a schematic flowchart of an icon moving method according to another embodiment of the present disclosure.

Please refer to FIG. 5, which is a schematic flowchart of an icon moving method according to another embodiment of the present disclosure. In this embodiment, the method of moving an icon is applied to a terminal as shown in FIG. 3B as an example, the method includes:

In an operation 501, in the icon management mode, the first page of the home screen is displayed in the main display area, the icon has a first size in the first page.

The implementation of this operation is similar to the operation 401, which is not repeated in this embodiment.

Figure 6:
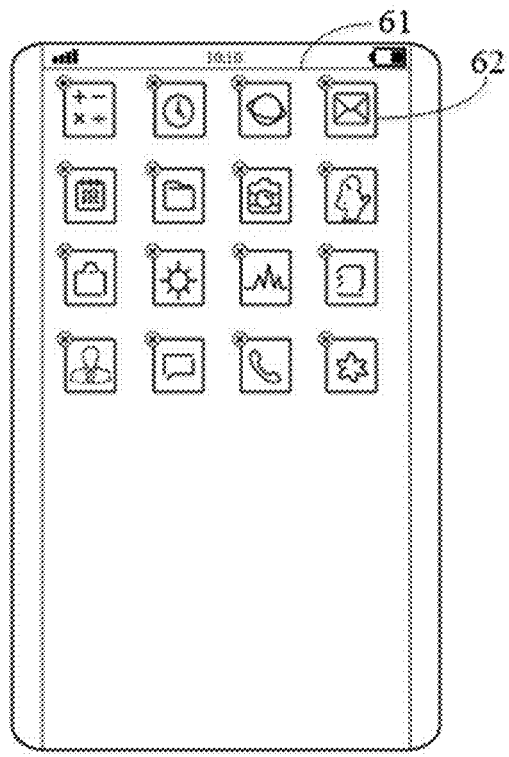
FIG. 6 is a schematic diagram of the interface of the first page in the icon management mode.

Schematically, as shown in FIG. 6, in the icon management mode, the first page is displayed in the front display area 61 of the curved surface screen, and each icon 62 in the first page is in a movable state.

In an operation 502, when the first operation on the icon in the first page is received, the icon is displayed with a second size in the subsidiary display area according to the first operation, and the second size is smaller than the first size.

In one possible embodiment, when detecting the icon in the first page is moved to the subsidiary display area, the terminal reduces the size of the icon from the first size to the second size and simplifies the details included in the icon. For example, the first size of the icon on the first page is 50 px×50 px, after the reducing operation, the second size of the icon is 20 px×20 px.

In other possible embodiments, the terminal prestores the icon with the first size and the icon with the second size. When detecting the icon in the first page is moved to the subsidiary display area, the terminal displays the icon with the second size on the subsidiary display area, and stop displaying the icon with the first size in the first page.

Optionally, since the icons are generally displayed in the upper part of the page of the home screen, in order to avoid the effect between the icon displayed in the subsidiary display area and the icon displayed in the page of the home screen, the terminal displays the icon that shank in the middle or lower part of the subsidiary display area.

In the icon management mode, each icon can not only be moved, but also can be deleted (usually, a "×" corner mark is displayed on the periphery of the icon). Therefore, in order to avoid deleting the icon with smaller size on the subsidiary display area by mistake, in one possible embodiment, the terminal stops responding the deleting operation on the icon displayed in the subsidiary display area, or, does not display the deleting control on the peripheral side of the icons in the subsidiary display area, so as to avoid the user deletes the icon on the subsidiary display area by mistake.

Figure 7:
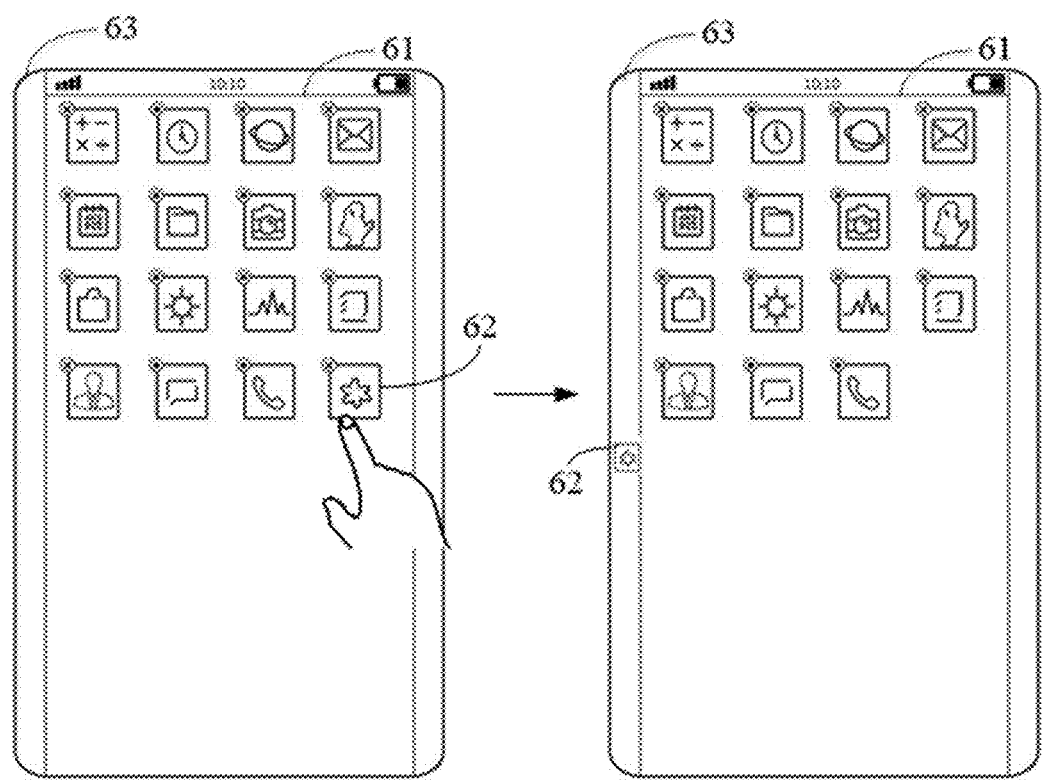
FIG. 7 is a schematic diagram of a process of moving an icon to a subsidiary display area.

As shown in FIG. 7, when the user performs the long press on the icon 62 in the front display area 61 and moves the icon to the subsidiary display area 63, the terminal displays the reduced icon 62 in the middle of the subsidiary display area 63, and not display the corner mark "×" on the peripheral side of the icon 62.

In an operation 503, the first page is switched to a second page of the home screen and the second page is displayed.

Optionally, after the icon waited to be moved is displayed in the subsidiary display area, the terminal switches the first page displayed in the main display area to the second page of the home screen according to the sliding operation on the main display area. When the terminal switching the page displayed in the main display area, the icon displayed in the subsidiary display area remains unchanged.

Figure 8:
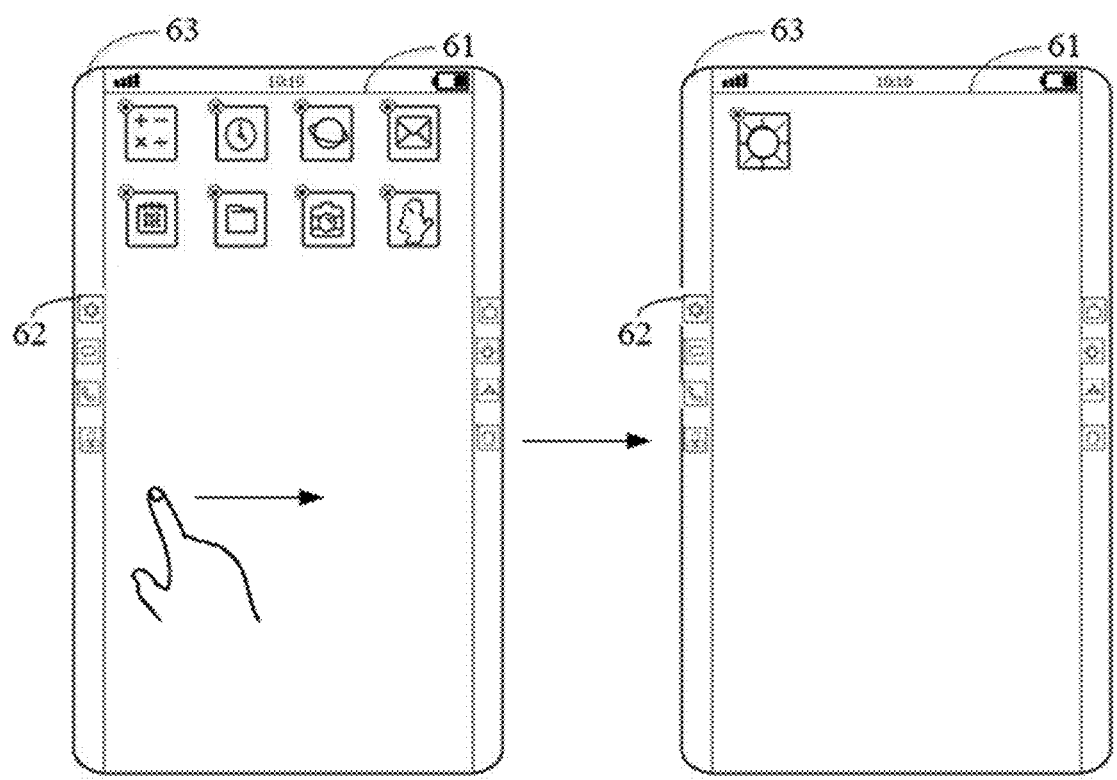
FIG. 8 is a schematic diagram of a process of switching and displaying the page of a home screen in a main display area.

Schematically, as shown in FIG. 8, after the user moves the icon 62 to the left and right subsidiary display area 63 and performs the sliding operation on the main display area 61. After the terminal detects the sliding operation, switches the page of the home screen displayed on the main display area, and keeps the icon 62 displayed in the left and right subsidiary display area 63 unchanging.

In an operation 504, when the second operation is received, the icon is displayed with a first size in the second page, and the first size is larger than the second size.

In some embodiments, when detecting the icon displayed in the subsidiary display area is moved to the main display area, the terminal restores the icon to restore the size of the icon from the second size to the first size. For example, the size of the icon in the subsidiary display area is 20 px×20 px (the second size), after the restoring, the size of the icon is 50 px×50 px (the first size).

In some possible embodiments, the terminal prestores the icon with the first size and the icon with the second size. When detecting the icon displayed in the subsidiary display area is moved to the main display area, the terminal displays the icon with the first size on the main display area, and stop displaying the icon with the second size in the subsidiary display area.

Optionally, in order to delete the icon displayed in the second page conveniently, while the terminal displays the restored icon in the second page, the terminal displays the delete control on the periphery of the icon, so that the user can deletes the icon.

As shown in FIG. 9, when the user performs the long press on the icon 62 in the subsidiary display area 63 and moves the icon to the main display area 61, the terminal displays the restored icon 62 in the main display area 61 according to the final position directed by the moving operation, and display the corner mark "×" on the peripheral side of the icon 62.

In this embodiment, when the terminal receives the first operation on the icon with the first size displayed in the first page, displays the icon with the second size in the subsidiary display area. To avoiding the icon displayed in the subsidiary display area affects the subsidiary display area, correspondingly, in the second page, when receiving the second operation, the terminal displays the icon with the first size in the second page to ensure the size of the icons displayed in the pages of the home screen to be the same.

In addition, in the embodiment, under the icon management mode, the terminal stops responding the deleting operation of the icon in the subsidiary display area, or, does not display the deleting control on the peripheral side of the icons in the subsidiary display area, so as to avoid the user deletes the icon on the subsidiary display area by mistake.

In the embodiment as shown in FIG. 5, the terminal displays the reduced icons in the subsidiary display area. when the subsidiary display area includes multiple similar icons (for example, the colors or the patterns of the icon are similar), and the target pages of the similar icons are different (that is, the icons moved to different pages), it is easy to make misoperation for the user moves the icon in the subsidiary display area to the pages directly. In order to avoid the above problem, based on FIG. 5, as shown in FIG. 10, after the operation 502, the method further includes the following operations.

In an operation 505, when a selection operation on the icon displayed in the subsidiary display area is received, display a prompt of the icon in the main display area and the prompt includes an application name corresponding to the icon and/or an enlarged icon.

For the icon displayed in the subsidiary display area, when the selection operation on the icon is received, in order to make the user know the relevant information of the application indicated by the icon is selected clearly, the terminal displays the prompt corresponding to the selected icon in the main display area.

In one possible embodiment, the terminal stores a corresponding relationship between an icon and an application name in advance. When the selection operation on the icon displayed in the subsidiary display area is received, the terminal searches the corresponding application name according to the icon identifier in the corresponding relationship and displays the application name. In other possible embodiments, when the selection operation on the icon displayed in the subsidiary display area is received, the terminal initiates the zoom function of the icon to enlarge the selected icon and display the enlarged icon in the main display area.

Figure 11:
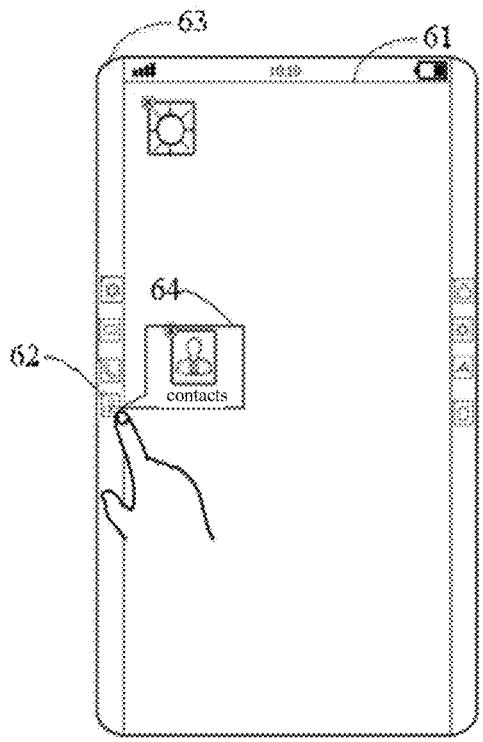
FIG. 11 is a schematic diagram of displaying prompt in a main display area.

As shown in FIG. 11, when detecting a click on the icon 62, the terminal displays the prompt 64 including the application name "contacts" and the enlarged icon in the main display area.

In order to avoid the prompt affecting the display of the main display area, in one possible embodiment, when the time for displaying the prompt reaches a threshold, the terminal stops displaying the prompt, for example, the threshold is set to 2 s. In other possible embodiments, when the movement on the selected icon is received, the terminal stops displaying the prompt.

In this embodiment, when the selection operation on the icon is received, the terminal displays the prompt corresponding to the selected icon in the main display area, so that the user knows the application indicated by the selected icon clearly, and avoid the misoperation caused by the icon displayed with the small size.

In actually, the user usually needs to place the same type of the applications on the same screen page, or place them in the same application folder. However, in the embodiment as shown in FIG. 5, the user needs to switch the pages of the home screen by sliding operation. When the number of the pages of the home screen is large and each pages includes the number of icons, the user cost a lot of time to determine move the icon to the page of the home screen, the page where the same type of the application is located, so that the operation is low efficiency. In order to improve the efficiency of moving the icon, based on FIG. 5, as show in FIG. 12, the operation 503 can be replaced with the following operations.

In an operation 506, when the selection operation on icon in the subsidiary display area is received, determine an associated icon corresponding to the icon, the type of the application indicated by the associated icon is the same as that indicated by the icon.

The user needs to select the icon first when moving the icon displayed in the subsidiary display area to the main display area. So, when the terminal detects the selection operation on the icon, obtains the type of the application corresponding to the selected icon, and determines the associated application according to the type of the application, and then determines the associated icon according to the associated application.

In one possible embodiment, the terminal prestores the types of the applications corresponding to the installed applications. When determines the associated application, the terminal determines the application has the same type with the selected application as the associated application.

For example, when the type of the application corresponding to the selected icon is instant messaging, the terminal determines the type of the installed applications is instant messaging as the associated application. When the type of the application corresponding to the selected icon is shopping, the terminal determines the type of the installed application is shopping as the associated application.

In other possible embodiments, the terminal may also determine the associated application and the associated icon according to the application name corresponding to the icon, the developer information or the color of the icon, which is not limited in the embodiments of the present disclosure.

In an operation 507, the first page is switched to the second page where the associated icon is located.

Optionally, the terminal stores the positions of each icon, the positions includes an identifier of the page of the home screen and the row and column coordinates on the page of the home screen. When switching the page of the home screen, the terminal obtains the position corresponding to the associated icon and determines the second page where the associated icon is located according to the position, and then control the main display area to switch to the second page and display the second page.

In one possible embodiment, when it is determined that the selected icon corresponding to at least two associated icons, and the at least two associated icons located in different pages of the home screen, the terminal counts the number of the associated icons in each page of the home screen, and determines the page includes the largest number of the associated icons as the second page. In other possible embodiments, the terminal can determine the second page by a using frequency of the associated application corresponding to the associated icon, the second page is the page of the home screen includes the associated application with the highest using frequency. It is not limited in the embodiment of the present disclosure.

For example, the terminal receives a selection operation on the icon displayed in the subsidiary display area, and determines the type of the application corresponding to the selected icon is social application, and obtains the page A of the home screen includes one social application, the page B of the home screen includes 0 social application, the page C of the home screen includes 3 social applications. So that the terminal determines the page C of the home screen is the target page of the home screen, and controls the main display area switch to the page C of the home screen, and displays the page C of the home screen.

It should be noted that if the second page automatically switched and displayed by the terminal in not the target page of the home screen desired by the user, the terminal can switch the page of the home screen according to the sliding operation on the flat display area by the user. It is not limited in the embodiment of the present disclosure.

In this embodiment, the terminal determines the associated icon related to the selected icon according to the type of the application corresponding to the selected icon, and then switch the page of the home screen to the page where the associated icon is located. It is convenient for the user to place the application of the same type in the same page of the home screen quickly and improve the efficiency of moving icons.

Figure 12:
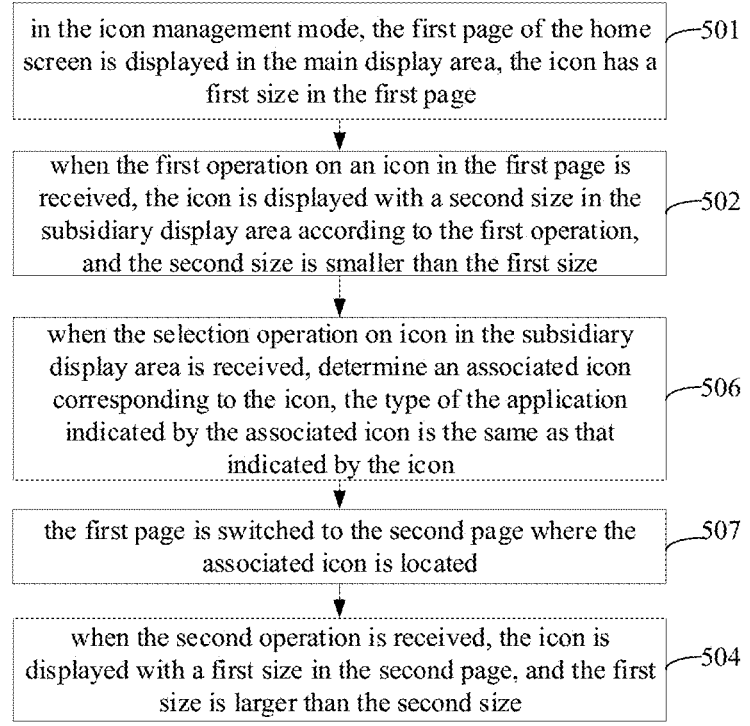
FIG. 12 is a schematic flowchart of another method for moving an icon according to an embodiment of the present disclosure.
Figure 13:
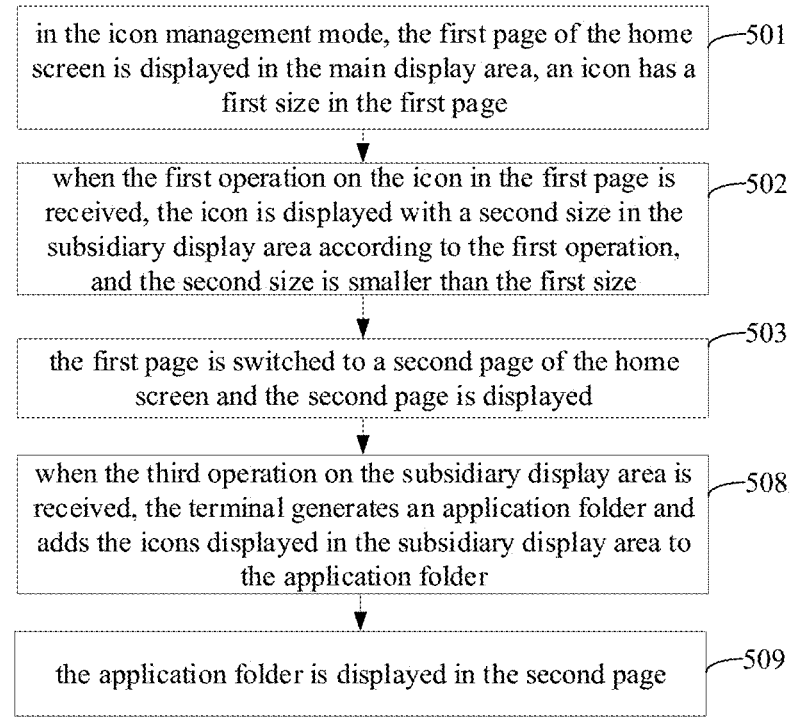
FIG. 13 is a schematic flowchart of an icon moving method according to another embodiment of the present disclosure.

In related art, when add the multiple icons in the different pages of the home screen to the same application folder, the user needs to moving the icons in the different pages of the home screen to the same page first, and then set an application folder to add the different icons to the application folder, the whole operation is complicated. In the embodiments of the present disclosure, with the help of the subsidiary display area, the user can add the multiple icons in the different pages of the home screen to the same application folder quickly. Based on the FIG. 5, as shown in FIG. 12, the operation 504 can be replaced with the following operations.

In an operation 508, when the third operation on the subsidiary display area is received, the terminal generates an application folder and adds the icons displayed in the subsidiary display area to the application folder.

In one possible embodiment, the user places the multiple icons that need to added to the same application folder in the same subsidiary display area. When the third operation on the subsidiary display area is received, the terminal generates an application folder automatically, and adds the icons displayed in the side of the subsidiary display area where the third operation is located to the application folder. Optionally, the third operation refers to an operation of long press on an idle area (the area that the icon is displayed), and moving to the main display area.

Figure 14:
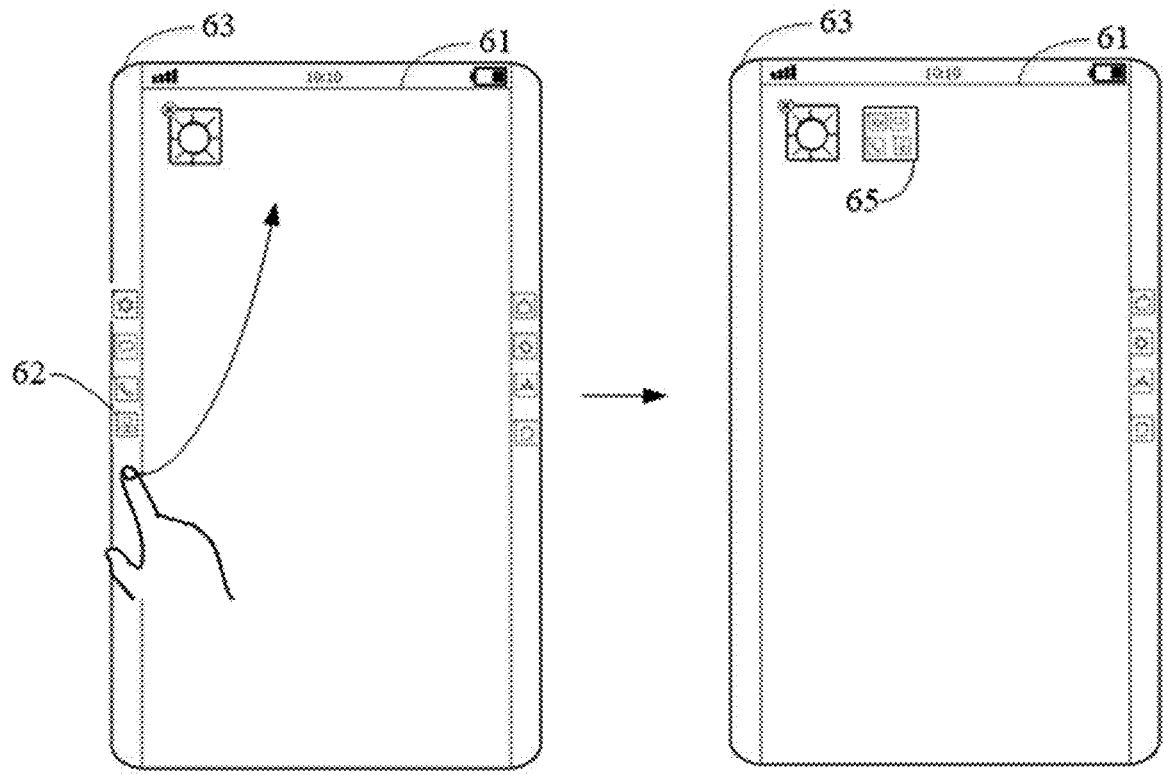
FIG. 14 is a schematic diagram of the process of adding multiple icons to the same application folder.

As shown in FIG. 14, the user places the 4 icons 62 that need to added to the same application folder on the left of the subsidiary display area 63. When it is detected the long press of the user on the idle area of the subsidiary display area 33, and move to the main display area 61, the terminal generates the application folder.

Usually, the user adds the applications of the same type to the same folder, in one possible embodiment, the terminal obtains the type of the application corresponding to each icon in the application folder, and determines the name of the application folder is the type of the highest proportion.

In an operation 509, the application folder is displayed in the second page.

Further, the terminal displays the generated application folder in the second page according to the position indicated by the third operation.

As shown in FIG. 14, the application folder 65 is displayed in the second page that currently displayed in the main display area 61, and the application folder 65 includes 4 icons 62 in the left of the subsidiary display area 63.

In this embodiment, after the user places the multiple icons that need to added to the same folder in the same subsidiary display area, by performing the third operation on the subsidiary display area, can add the multiple icons to the same folder quickly, and displays the folder in the page of the home screen, so that it can improve the efficiency of moving the icons.

Figure 15:
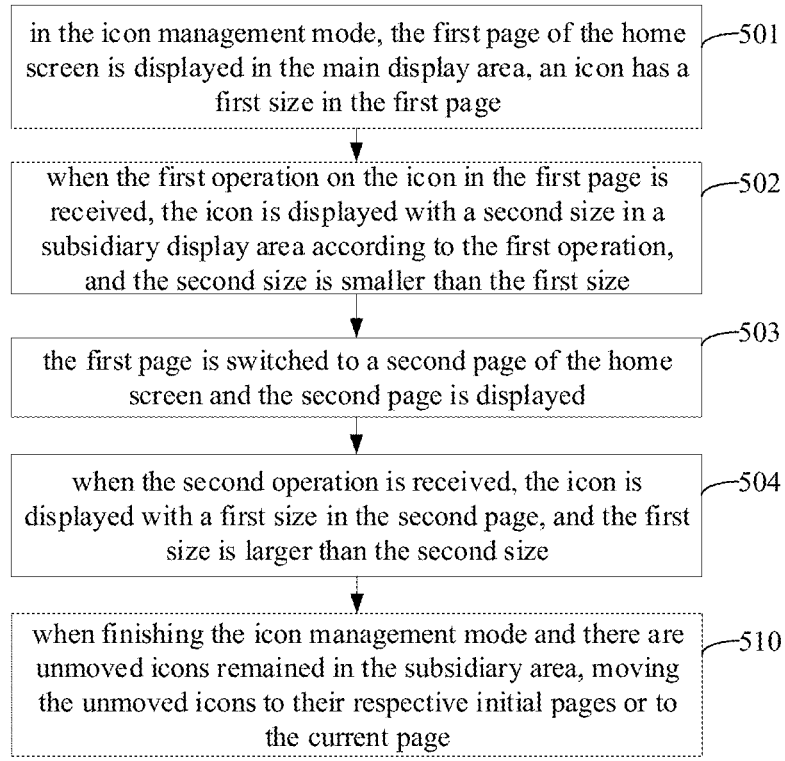
FIG. 15 is a schematic flowchart of an icon moving method according to another embodiment of the present disclosure.

In actually, when the movement operation on all the icons displayed in the curved display area is not completed and leave the icon management mode, the terminal needs to restore the icons in the curved display screen to their respective initial pages. Based on the FIG. 5, as shown in FIG. 15, after the operation 504, the method further includes the following operations.

In an operation 510, when leave the icon management mode and there are unmoved icons remained in the subsidiary area, moving the unmoved icons to their respective initial pages or to the current page.

In one possible embodiment, for moving each icon displayed in the subsidiary display area, the terminal stores the initial position information of the icon, the initial position information includes an identifier of an initial page where the icon is located and the coordinates in the initial page. When detecting leaves the icon management mode, and there are unmoved icons remained in the subsidiary area, the terminal obtains the initial position information corresponding to each unmoved icon and moving the unmoved icons to the initial pages according to the initial position information.

For example, when the terminal detects it leaves the icon management mode, icon A and the icon B are displayed in the subsidiary display area. The initial position information of the icon A is: home screen page A, (3,3); the initial position information of the icon B is: home screen page C, (4,1), the terminal restores the icon A to the icon position in row 3 and column 3 of home screen page A and restores the icon B to the icon position in row 4 and column 1 of home screen page C.

In other possible embodiments, when detecting leave the icon management mode and there are unmoved icons remained in the subsidiary area, the terminal, moves the unmoved icons to the current page of the home screen (that is the second page).

Optionally, in order to avoid misoperation, when detecting leave the icon management mode and there are unmoved icons remained in the subsidiary area, the terminal, the terminal display the prompt message in the main display area to prompt the user whether to end the icon management, and when an ending instruction is received, restores the icons displayed in the subsidiary display area.

In this embodiment, when the movement operation on all the icons in the subsidiary display area is not completed and leave the icon management mode in advance, the terminal restores the icons according to the initial position information of the icons recorded in advance, to reduce the effect by the misoperation of the user.

The following is the device embodiments of the present disclosure. For the parts not described in detail in the device embodiments, reference may be made to the technical details disclosed in the above method embodiments.

Figure 16:
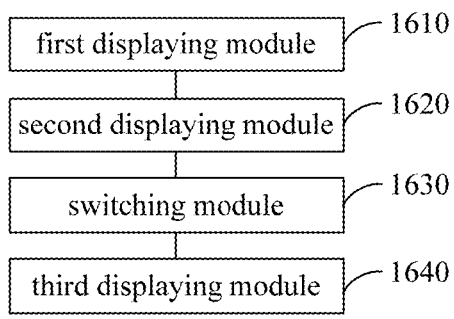
FIG. 16 is a schematic structural diagram of an icon moving device according to an embodiment of the present disclosure.

Please refer to FIG. 16, which is a schematic structural diagram of an icon moving device according to an embodiment of the present disclosure. The icon moving device can be implemented as all or part of a terminal through software, hardware, and a combination of both. The icon moving device includes a first displaying module 1610, a second displaying module 1620, a switching module 1630 and a third displaying module 1640.

The first displaying module 1610 is configured to display a first page of a home screen in the main display area under the icon management mode;

the second displaying module 1620 is configured to when receiving a first operation on the icon in the first page, display the icon in the subsidiary display area in response to a first operation;

the switching module 1630 is configured to switch the first page to a second page of the home screen and display the second page of the home screen; and the third displaying module 1640 is configured to display the icon in the second page in response to a second operation, when receiving the second operation.

Optionally, the size of the icon in the first page is the first size, and the second displaying module 1620 is configured to display the icon with a second size in the subsidiary display area, and the second size is smaller than the first size.

Optionally, the device further includes:

the fourth displaying module is configured to display a prompt of the icon in the main display area, when a selection operation on the icon is received in the subsidiary display area, and the prompt comprises an application name corresponding to the icon and/or an enlarged icon.

Optionally, the size of the icon in the subsidiary display area is the second size, and the third displaying module 1640 is configured to:

display the icon with the first size in the second page, and the first size being larger than the second size.

Optionally, the switching module 1620 is further configured to:

determining an associated icon corresponding to the icon when the selection operation on icon in the subsidiary display area is received, the type of the application indicated by the associated icon being the same as that indicated by the icon;

switch the first page to the second page where the associated icon is located.

Optionally, the device further includes:

a generating module is configured to generate an application folder and add the icon in the subsidiary display area to the application folder, when a third operation in the subsidiary display area is received;

a fifth displaying module is configured to display the application folder in the second page.

Optionally, the device further includes:

a moving module is configured to when leaving the icon management mode and there are unmoved icons remained in the subsidiary area, move the unmoved icons to their respective initial pages or to the current page.

Optionally, the terminal is provided with a curved surface screen, the main display area is a front display area of the curved surface screen, and the subsidiary display area is a side area of the curved surface screen.

In summary, by dividing the display screen of the terminal into a main display area and a subsidiary display area, when moving the icon, the icon waited to be moved can be displayed in the subsidiary display area, thereby ensuring that the switching of the pages would not affect the subsidiary display area. According to the receiving of the moving operation, the icon displayed in the subsidiary display area is displayed in the current display page of the main display area, so the icons are moved across the screen. Compared to the method for moving icon in the related art, in the embodiments of the present disclosure, after moving the icon to the subsidiary display area, the user does not need to keep pressing the icon, so that can reduce the difficulty of operation of moving the icon. At the same time, the subsidiary display area can accommodate multiple icons, so that the user can move the multiple icons at the same time to improve the efficiency of the operation of moving the icons.

In the embodiments, when the terminal receives the first operation on the icon with the first size displayed in the first page, displays the icon with the second size in the subsidiary display area. To avoiding the icon displayed in the subsidiary display area affects the subsidiary display area, correspondingly, in the second page, when receiving the second operation, the terminal displays the icon with the first size in the second page to ensure the size of the icons displayed in the pages of the home screen to be the same.

In the embodiments, when the selection operation on the icon is received, the terminal displays the prompt corresponding to the selected icon in the main display area, so that the user knows the application indicated by the selected icon clearly, and avoid the misoperation caused by the icon displayed with the small size.

In the embodiments, the terminal determines the associated icon related to the selected icon according to the type of the application corresponding to the selected icon, and then switch the page of the home screen to the page where the associated icon is located. It is convenient for the user to place the application of the same type in the same page of the home screen quickly and improve the efficiency of moving icons.

In the embodiments, after the user places the multiple icons that need to added to the same folder in the same subsidiary display area, by performing the third operation on the subsidiary display area, can add the multiple icons to the same folder quickly, and displays the folder in the page of the home screen, so that it can improve the efficiency of moving the icons. In the embodiments, when the movement operation on all the icons in the subsidiary display area is not completed and leave the icon management mode in advance, the terminal restores the icons according to the initial position information of the icons recorded in advance, to reduce the effect by the misoperation of the user.

Those skilled in the art should be aware that in one or more of the above examples, the functions described in the embodiments of the present disclosure may be implemented by hardware, software, firmware, or any combination thereof. When implemented in software, these functions may be stored in or transmitted over as one or more instructions or code on a computer-readable medium. Computer-readable media includes computer storage media and communication media including any medium that facilitates transfer of a computer program from one place to another. A storage media may be any available media that can be accessed by a general purpose or special purpose computer.

The above are only preferred embodiments of the present disclosure, and are not intended to limit the present disclosure. Any modification, equivalent replacement, or improvement made within the spirit and principle of the present application shall be included in the protection of the present disclosure within range.

What is claimed is:

1. An icon moving method, applied to a terminal with a main display area and a subsidiary display area, the method comprising:

displaying a first page of a home screen in the main display area, in response to entering an icon management mode under which each icon in pages of the home screen is in a movable state;

in response to receiving a first operation performed on an icon displayed in the first page, displaying the icon in the subsidiary display area, and stopping displaying the icon in the first page;

switching the first page to a second page of the home screen and displaying the second page of the home screen in the main display area, and making the icon displayed in the subsidiary display area unchanged during the switching, wherein the second page is a page of the home screen different from the first page; and in response to receiving a second operation performed on the icon displayed in the subsidiary display area, displaying the icon in the second page and stopping displaying the icon in the subsidiary display area, thereby moving the icon from the first page of the home screen to the second page of the home screen.

2. The method as claimed in claim 1, wherein the icon has a first size when being displayed in the first page, the operation of displaying the icon in the subsidiary display area comprises:

displaying the icon with a second size in the subsidiary display area, the second size being smaller than the first size.

3. The method as claimed in claim 1, after the operation of displaying the icon in the subsidiary display area, the method further comprising:

displaying a prompt of the icon in the main display area in response to receiving a selection operation on the icon displayed in the subsidiary display area, the prompt comprising an application name corresponding to the icon.

4. The method as claimed in claim 1, wherein the icon has a second size when being displayed in the subsidiary display area, the operation of displaying the icon in the second page comprises:

displaying the icon with a first size in the second page, the first size being larger than the second size.

5. The method as claimed in claim 1, wherein the operation of switching the first page to a second page of the home screen comprises:

determining an associated icon corresponding to the icon in response to receiving a selection operation performed on the icon displayed in the subsidiary display area, a type of an application indicated by the associated icon being the same as that indicated by the icon;

determining, as a second page of the home screen, a page of the home screen where the associated icon is located; and switching the first page to the second page of the home screen.

6. The method as claimed in claim 1, after the operation of switching the first page to the second page of the home screen and displaying the second page of the home screen, the method further comprising:

generating an application folder and adding the icon displayed in the subsidiary display area to the application folder, in response to receiving a third operation performed in the subsidiary display area; and displaying the application folder in the second page.

7. The method as claimed in claim 1, wherein the method further comprises:

when finishing the icon management mode and there are unmoved icons remained in the subsidiary area, moving the unmoved icons to their respective initial pages of the home screen or to the current page of the home screen.

8. The method as claimed in claim 1, wherein the terminal is provided with a curved surface screen, the main display area is a front display area of the curved surface screen, and the subsidiary display area is a side display area of the curved surface screen.

9. A terminal, wherein the terminal comprises a curved surface screen, a processor, a memory connected to the processor, and a computer program stored in the memory and executable by the processor, the curved surface screen comprises a front display area and a side display area, when executing the computer program, the processor implements an icon moving method, and the method comprises:

displaying a first page of a home screen in the front display area, in response to entering an icon management mode under which each icon in pages of the home screen is in a movable state;

in response to receiving a first operation performed on an icon displayed in the first page, displaying the icon in the side display area, and stopping displaying the icon in the first page;

switching the first page to a second page of the home screen and displaying the second page of the home screen in the front display area, and making the icon displayed in the side display area unchanged during the switching, wherein the second page is a page of the home screen different from the first page; and in response to receiving a second operation performed on the icon displayed in the side display area, displaying the icon in the second page and stopping displaying the icon in the side display area, thereby moving the icon from the first page of the home screen to the second page of the home screen.

10. A non-transitory computer-readable storage medium, having a computer program stored therein, wherein an icon moving method applied to a terminal is performed when the computer program is executed by a processor, and the method comprises:

dividing a display screen of the terminal into a main display area and a subsidiary display area adjacent to the main display area;

displaying a first page of a home screen in the main display area, in response to entering an icon management mode under which each icon in pages of the home screen is in a movable state, an icon displayed in the first page having a first size;

in response to receiving a first operation performed on the icon displayed in the first page, displaying the icon in the subsidiary display area, and stopping displaying the icon in the first page, the icon displayed in the subsidiary display area having a second size smaller than the first size;

in response to receiving a selection operation performed on the icon displayed in the subsidiary display area, determining an associated icon corresponding to the icon, a type of an application indicated by the associated icon being the same as that indicated by the icon;

determining, as a second page of the home screen, a page of the home screen where the associated icon is located;

switching the first page to the second page of the home screen and displaying the second page of the home screen in the main display area, and making the icon displayed in the subsidiary display area unchanged during the switching, wherein the second page is a page of the home screen different from the first page; and in response to receiving a second operation performed on the icon displayed in the subsidiary display area, displaying in the second page the icon with the first size and stopping displaying the icon in the subsidiary display area, thereby moving the icon from the first page of the home screen to the second page of the home screen.

11. The method as claimed in claim 1, before the operation of displaying the icon in the subsidiary display area in response to receiving the first operation, the method further comprising:
determining whether the first operation is received.

12. The method as claimed in claim 11, wherein the terminal prestores coordinates of the main display area and the subsidiary display area, the operation of determining whether the first operation is received, comprises:
detecting whether coordinates of the icon displayed in the main displayed area are changed; and
detecting whether the coordinates of the icon intersect with the coordinates of the subsidiary display area.

13. The method as claimed in claim 1, before the operation of displaying the icon in the second page in response to receiving the second operation, the method further comprising:
determining whether the second operation is received.

14. The method as claimed in claim 13, wherein the terminal prestores coordinates of the main display area and the subsidiary display area, the operation of determining whether the second operation is received, comprises:
detecting whether coordinates of the icon displayed in the subsidiary display area are changed; and
detecting whether the coordinates of the icon intersect with the coordinates of the main display area.

15. The method as claimed in claim 1, after the operation of displaying the icon in the subsidiary display area, the method further comprising:
displaying a prompt of the icon in the main display area in response to receiving a selection operation on the icon displayed in the subsidiary display area, the prompt comprising an enlarged icon.

16. The method as claimed in claim 15, wherein the operation of displaying a prompt of the icon in the main display area, comprises:
enlarging the icon; and
displaying the enlarged icon in the main display area.

17. The method as claimed in claim 3, wherein the terminal prestores a corresponding relationship between the icon and an application name, the operation of displaying a prompt of the icon in the main display area, comprises:
displaying, according to the corresponding relationship, the application name corresponding to the icon in the main display area.

18. The method as claimed in claim 3, further comprising:
obtaining a time during which the prompt is displayed; and
stopping displaying the prompt when the time reaches a threshold.

19. The method as claimed in claim 1, wherein the terminal prestores the icon with a second size, the method further comprises:
displaying the icon with the second size in the subsidiary display area when detecting the icon displayed in the first page is moved to the subsidiary display area.

20. The method as claimed in claim 1, wherein the terminal prestores the icon with a first size, the method further comprises:
displaying the icon with the first size in the main display area when detecting the icon displayed in the subsidiary display area is moved to the main display area.

* * * * *